United States Patent [19]

Breyer et al.

[11] Patent Number: 4,882,848
[45] Date of Patent: Nov. 28, 1989

[54] PROBE HEAD FOR A COORDINATE-MEASURING INSTRUMENT

[75] Inventors: Karl-Hermann Breyer, Heidenheim; Klaus Herzog, Oberkochen; Franz Szenger, Königsbronn, all of Fed. Rep. of Germany

[73] Assignee: Carl-Zeiss-Stiftung, Heidenheim/Brenz, Oberkochen, Fed. Rep. of Germany

[21] Appl. No.: 225,162

[22] Filed: Jul. 28, 1988

[30] Foreign Application Priority Data

Jul. 30, 1987 [DE] Fed. Rep. of Germany ....... 3725205
Jul. 30, 1987 [DE] Fed. Rep. of Germany ....... 3725206

[51] Int. Cl.$^4$ .............................................. G01B 7/28
[52] U.S. Cl. ...................................... 33/559; 33/561; 33/832; 33/572
[58] Field of Search ................. 33/503, 504, 556, 558, 33/561, 555, 169 R, 172 E, 1 M, 792, 832

[56] References Cited

U.S. PATENT DOCUMENTS 3,869,799  3/1975  Neuer ...................................... 33/561
4,530,159  7/1985  Ernst ................................... 33/559 X
4,536,961  8/1985  Degoumois ........................ 33/558 X
4,769,919  9/1988  Lloyd ..................................... 33/558

FOREIGN PATENT DOCUMENTS

2129133  5/1984  United Kingdom ................. 33/556

Primary Examiner—Harry N. Haroian
Attorney, Agent, or Firm—Hopgood, Calimafde, Kalil, Blaustein & Judlowe

[57] ABSTRACT

A probe head for a coordinate-measuring instrument has a torsionally rigid, play-free and friction-free probe-suspension system which defines a three-dimensional coordinate system wherein the work-contact pin of the probe is deflectable in all three directions in space. For each of the three coordinate directions, an incrementally operating displacement-measuring system is provided, and each such system is associated with a zero indicator for recognition of the zero position of the system. Upon initial contact of the probe with the object to be measured, a trigger pulse is produced via a sensor. A subsequent electronic system processes the different signals delivered by the probe head so that optional operation is available either as a switching probe head or as a measuring probe head.

19 Claims, 4 Drawing Sheets

PROBE HEAD FOR A COORDINATE-MEASURING INSTRUMENT

BACKGROUND OF THE INVENTION

The present invention relates to a probe head for a coordinate-measuring instrument wherein deflectable probe-mounting structure defines a three-dimensional coordinate system so that a work-contacting probe pin can be deflectable in all of three coordinate directions in space.

Coordinate-measuring instruments serve to detect with high precision the space coordinates of a workpiece at preselected locations on the workpiece, and to display and/or feed measured data to an associated computer. The computer determines the desired measurement of the workpiece from the measured coordinate values.

To carry out this measurement task, a probe head displaceably mounts a probe having a work-contact pin, and the probe head is mounted to a coordinate-measuring instrument for displacement in all three directions in space. The space coordinates of the probe pin at any moment are known from measurement-value transmitters which are connected to and form part of the measuring instrument. The means for thus displacing the probe head can be actuated manually but are usually motor-driven, to effect controlled three-dimensional displacement of the probe head. Such a coordinate-measuring instrument is known, for example, from West German Patent 2,718,506 and its corresponding U.S. Pat. No. 4,175,327.

The probe head itself has the task of signalling retention of the instantaneous space coordinates of the tip of the probe pin as soon as said tip contacts the workpiece to be measured. Thee coordinate values are then fed to an evaluation unit which computes the desired dimensions of the workpiece from the coordinate values determined at different points of workpiece contact.

The probe head itself must be so developed that probe-pin contact with the workpiece (and the coordinate measurement concomitant with such contact) are possible from all three directions in space. In the contacting process, the mechanism for moving the probe head cannot be brought to a stop at the precise instant of probe-tip contact with the workpiece; it is therefore necessary to so mount the probe in the probe head as to permit probe-pin deflection in all directions of workpiece contact, i.e., in all three space coordinates.

A large number of probe heads are known which are distinguished by the manner in which a determination is made of space-coordinate values associated with the contacting process. In general, one distinguishes between two categories, namely switching probe heads and measuring probe heads.

The first category, namely, the so-called switching probe heads, includes those which upon the first contact of the probe tip with the object being measured initiates a trigger pulse which retains the instantaneously operative coordinate values.

Such a probe head is illustratively known from West German Patent 2,712,181 and its corresponding U.S. Pat. No. 4,177,568. The probe head has a support which determines the zero position of the probe pin with high precision and to which the probe pin is allowed to return, by a corrective repositioning of the probe head after each deflection. To generate the trigger pulse at the instant of workpiece contact, a highly sensitive sensor, such as a piezoelectric element, is connected to the probe pin.

In the work-contacting procedure, the probe head is advanced by the coordinate-measuring instrument toward the workpiece until the tip of the probe contacts the workpiece, whereupon the sensor initiates the trigger pulse. The trigger pulse transiently freezes the coordinate values which existed at the instant of workpiece contact. As the probe head momentarily continues its advancing movement, the probe pin is deflected from its zero position. This deflection, via electro-optical means, initiates a second pulse which verifies the trigger pulse, i.e., enters the transiently frozen coordinate values in the computer, and at the same time initiates the process of braking the probe-head drive of the coordinate-measuring instrument. In this connection, the probe pin comes to a deflected standstill, and the probe-head drive of the measuring instrument is reversed, to reposition the probe head until the probe pin has resumed its zero position. The measuring instrument is then ready for the next work-contacting procedure, at a different location on the workpiece.

A switching probe head of the indicated character is relatively inexpensive and is to a large extent instrument-compatible, since detection of the measurement value occurs at the instant of probe-pin contact with the object being measured.

The second category includes the so-called measuring probe heads. They illustratively comprise a probe-mounting system which consists of a torsionally rigid sequence of play-free and friction-free linear suspensions, wherein each suspension accommodates deflection in a different one of the coordinate directions of a three-dimensional coordinate system. These linear suspensions are advantageously developed as spring parallelograms, incorporating installed direction-sensitive and position-sensitive signal transmitters which supply signals upon deflection of the probe pin out of its zero position. These signal transmitters are so integrated with a position-control circuit that, commencing with the instant of initial probe-tip contact with the object being measured, (1) probe-head repositioning data accumulate for probe deflection after initial workpiece contact, and (2), upon attaining a predetermined probe deflection (or a predetermined time after initial workpiece contact), the measurement is deemed to have been validated and is automatically entered into the computer of the coordinate-measuring instrument.

Such a measuring probe head is known, for example, from West German Patent 2,242,355 and its corresponding U.S. Pat. No. 3,869,799.

The position-control circuit for this known probe head can be developed in such manner that, after each contact with the workpiece, the probe head is returned in controlled fashion either to its zero position or to a starting position in which a preset work-contacting measurement force is reached, it being noted that any mechanical oscillation occasioned by work contact will have dissipated by the time of return to the zero or to the starting position.

It is also possible to so develop the position-control circuit that return to zero position is dispensed with, and so that the computer combines the position signals with the coordinate signals of the coordinate-measuring instrument. This permits continuous contacting of an object to be measured along a predetermined line, i.e., so-called "scanning". In this connection, the actual coordinates of the object being measured are determined by computer at each point along the scanning path.

Measuring probe heads of the character indicated are costly in view of the required high mechanical and electronic expense. Generally, they are also not instrument-compatible and are not easy to handle.

Each of the two indicated probe-head systems, namely, of the switching type and of the measuring type, has characteristic advantages and disadvantages, calling for application to different industrial measurement tasks. The desire has therefore arisen for a probe system which permits both the measurement mode of operation and the switching mode of operation. A first solution for such a probe system is described in West German Patent No. 2,835,615, wherein a probe head includes a light source which provides at the probe pin a beam which forms an inward extension of the probe-pin axis. Within the probe head, this light beam strikes a position-sensitive photodiode so that probing deflection can be measured as with a measuring probe head, by means of analog signals. But such a measurement is possible only in one plane, i.e., in two coordinate directions, and furthermore cannot be carried out with the precision obtainable in modern coordinate-measuring instruments. In the Journal, "Messen und Prufen-/Automatik", January/February, 1984, Pages 40/45, it is stated that the probe known from West German Patent No. 2,835,615 can also be used as a switching probe; to this end, at Section 3.3.2 (Page 43), it is explained that a coincidence circle is centered on the point of origin of the two-dimensional coordinate system of the probe, and the radius of this coincidence circle defines a constant value of probe-pin deflection. A microcomputer continuously, at brief intervals, tests whether the probe axis is passing through the periphery of this circle. If so, then the contact coordinates are accepted for entry into the computer.

This known probe is suitable only for the two-dimensional contacting of an object to be measured and requires a relatively high electronic expense.

BRIEF STATEMENT OF THE INVENTION

It is the object of the present invention to develop a probe head for a three-dimensional coordinate-measuring instrument wherein the probe (a) is suspended by a three-coordinate system and is deflectable in all three directions in space, (b) is universally usable, i.e., both as a switching probe head and as a measuring probe head, and (c) is characterized by relatively little mechanical and electronic expense.

This object is achieved by the invention, in a probe head wherein probe displacement is measurable by a separate system for each of three coordinate directions (x, y, z) via signals proportional to probe deflection in each of these coordinate directions; wherein each displacement-measuring system has its own means of recognizing the zero position of the system; wherein each displacement-measuring system has its own means to position the probe in the zero position of the system, regardless of the instantaneous orientation of the probe; and wherein means are provided for switching the probe head between a switching mode (in which a work-contact trigger signal is produced, for use in coordinate measurement) and a measuring mode (in which signals of the displacement-measuring systems are used for coordinate measurement).

The resulting advantages are essentially that the probe head of the invention can be used universally, i.e., as both a switching probe head and a measuring probe head, without having to dispense with the precision of measurement obtainable with special-purpose probe heads of the present state of the art.

Further advantages of the invention reside in advantageous measures and solutions for initiating a trigger pulse, for developing the displacement-measurement signals of the probe head, for constructing the probe-suspension system, and for providing zero-positioning spring systems within the probe head.

DETAILED DESCRIPTION OF A PREFERRED EMBODIMENT

The invention will be described in conjunction with the accompanying drawings, subject to the limitation that for reasons of clarity and simplification, taring systems of the preferred embodiment are not shown for all of the suspension systems of the probe head; the provision of three-axis automatic taring, enabling universal gravity-compensated zero-positioning of the probe for any orientation in space, is disclosed in copending U.S. application Ser. No. 225,178 filed on even date herewith. In said accompanying drawings.

Figure 1:
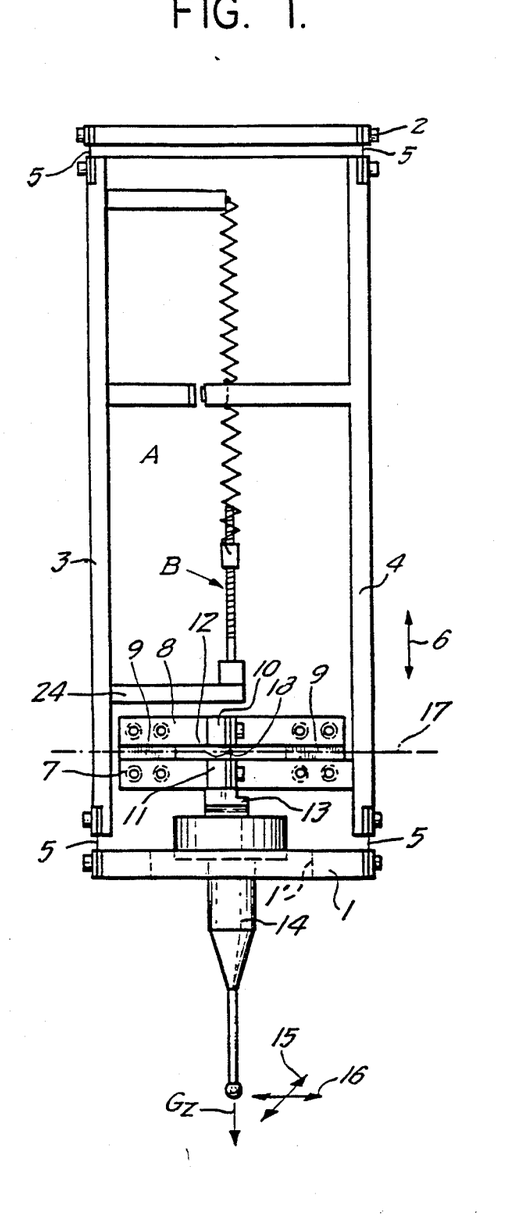
FIG. 1 is a simplified view in elevation of the multiple-coordinate probe-suspension system of a probe head, wherein certain signal-generating and zero-positioning means have been omitted, to avoid clutter in the drawing.

In the simplified probe head of FIG. 1, a spring parallelogram consists of side parts or panels 1 to 4 which are connected to each other by leaf springs 5, it being understood that instead of leaf springs 5, one may also provide crossed-spring joints (flexural pivots) which consist of two leaf springs arranged at a right angle to each other. The side part or panel 3 is a base that is adapted for rigid connection to a coordinate-measuring instrument, while the side part or panel 4 can be deflected in the direction indicated by arrow 6; arrow 6 thus identifies the first of three orthogonally related coordinate directions of deflection action in the probe-suspension system of FIG. 1.

The second and third coordinate directions of deflection action in the probe-suspension system of FIG. 1 are provided by the mutually perpendicular deflection axes of a so-called Hooke's "universal" joint (Kardangelenk)

having a first bar member 7 that is fixedly carried by the displaceable panel 4, and a second bar member 8 that is flexibly connected by spaced leaf springs 9 to correspondingly spaced locations on bar member 7, with single-axis flexibility about a second axis 17 of deflectability. A third bar member 10 is rigidly integrated with bar 8 to define a rigid cross of bars 8/10, the latter being orthogonally directed in a transverse plane that is normal to the deflection direction 6. Finally, a fourth bar member 11 has spaced leaf-spring connections 9' to the third bar member 10, being in the same general transverse plane of the first bar member 7 and with single-axis flexibility about a third axis 18 of deflectability; to permit flexible action of the fourth bar member 11 about either or both of the orthogonal deflection axes 17/18 and with respect to the first bar member 7, it will be understood that bar members 7/11 are suitably formed, as with local recesses, to provide sufficient clearance for at least some relative movement of members 7/11 about these axes, both of which are orthogonal to the deflection direction 6.

As a result of the described relationships, the fourth bar member 11 is deflectable in three mutually perpendicular component directions with respect to the base panel 3 of measuring-instrument mounting; and a measuring probe 14 with the same universal deflectability is shown mounted to a structural part 13 of the fourth bar member 11, (a) in axial alignment with the geometrical intersection point 12 of the flexible-hinge axes 17/18, (b) said axial alignment being parallel to the displacement direction 6, and (c) probe 14 extending, with clearance, through a circular cut-out in panel 1. The resulting component directions of probe displaceability via the hinge axes 17/18 are diagrammatically represented by arrows 15/16, respectively.

Upon movement in the direction of arrow 15, probe pin 14 has limited freedom of pivoting displacement about axis 17, involving coaction of parts 7/8 via a first pair of leaf springs 9. And movement of the pin or probe 14 in the direction of arrow 16 involves coaction of parts 10/11, via a second pair of leaf springs 9', for limited freedom of pivoting displacement about rotary axis 18, perpendicular to axis 17 and intersecting the same at 12.

Figure 2:
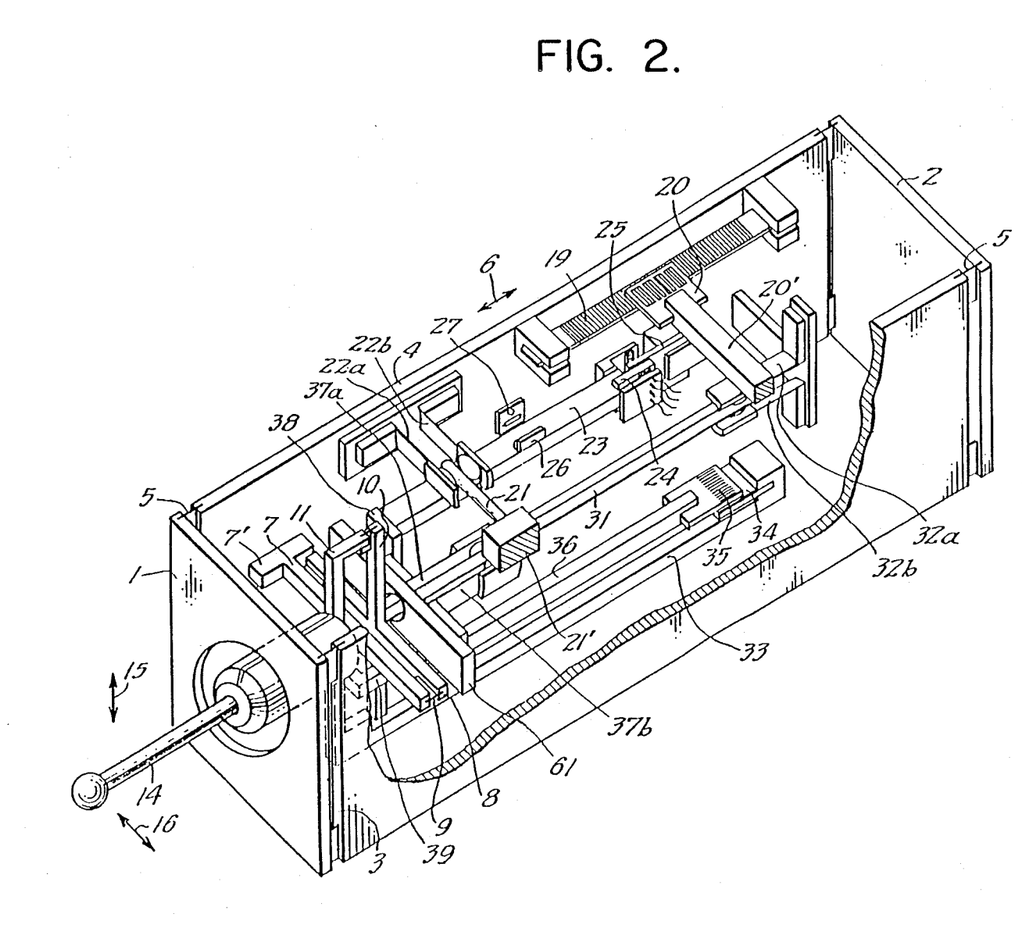
FIG. 2 is an isometric view of a probe head of the invention, in which signal-generating means are additionally shown, with part of one of the suspension systems broken-away, to reveal internal detail.

FIG. 2 is a more detailed showing of a probe head which will be recognized as having the spring-suspension systems of FIG. 1; FIG. 2 additionally shows displacement-measuring and opposed-spring systems within the probe head. When this probe head is so mounted to a coordinate-measuring instrument as to vertically orient the axis of probe 14 (as in the case of FIG. 1), the displacement direction of arrow 6 corresponds to the z-coordinate. In this orientation, the spring parallelogram 1 to 4 will be understood to have been weight-compensated, in offset of the probe gravity-weight vector $G_z$, to a z-axis zero position, by automatic taring-adjustment means designated generally A-B in FIG. 1 but shown and described in detail in said application Serial No. 225,118, filed on even date herewith; said application also describes automatic taring-adjustment means for each of the other two further orthogonally related directions of probe-14 deflectability, and the probe head of the present disclosure will be understood to be similarly and automatically tare-adjusted, as dictated by gravity-vector direction and magnitude, whatever the orientation of the probe head in space. And it will further be understood that in a preferred use of the present invention, the probe head will be mounted to a two-axis articulating head carried as a selectively positionable part of the multiple-coordinate measuring instrument; detail of such a two-axis articulating head is found in pending patent application Serial No. 191,392, filed May 9, 1988.

A first incremental displacement-measuring system for measurement of probe displacement from the tare-compensated zero position and in the direction 6 (i.e., the z-direction for a vertical orientation of probe 14), is shown in FIG. 2 to comprise a measurement grid 19 securely mounted to panel 4 and a scanning grid 20 which via a transversely extending support bar 20' will be understood to be securely mounted to panel 3; in FIG. 2, the broken-away portion of panel 3 prevents a showing of bar-20' connection to panel 3, but the cross-hatched end of bar 20' is to be understood to be suggestive of such connection.

Figure 7:
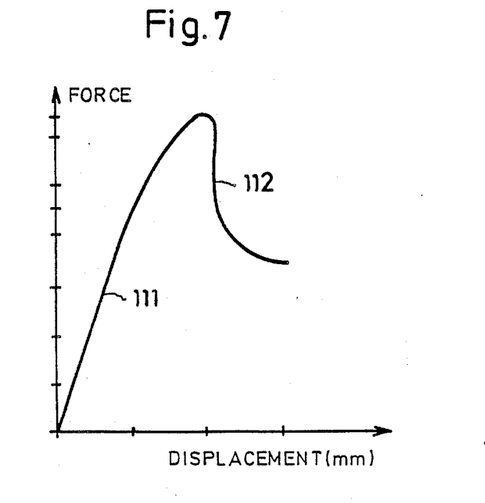
FIG. 7 is a graph depicting the force vs. displacement characteristic of one of the springs of FIG. 6.

The side panel or plate 3 will be recalled as being the means of attaching the probe head to a coordinate-measurement instrument. FIG. 2 additionally indicates, by cross-hatching 21', that a second transversely extending bar 21 is securely mounted to panel 3 and that it engages between cantilevered ends of opposed elements 22a, 22b of a spring system 22 which is securely mounted to the displaceable panel 4. The spring elements are only slightly preloaded in opposition against bar 21 and serve (1) to oppose movement away from zero position, in either of the directions of arrow 6 and (2) to assure predetermined level of applied probe 14 force (in the direction of arrow (6) against a workpiece location to be measured; since, as noted above, the probe 14 will have been automatically tare-adjusted to zero position for all three of its directions of deflectability, the spring system 22 can be highly sensitive to deflection upon contact with a workpiece. The spring system 22 is advantageously so developed that each of the elements 22a, 22b has a descending force/displacement characteristic, thus avoiding harmfully great application pressures for larger deflections of probe 14 in the direction 6 (z-axis direction). The force/displacement curve is shown in FIG. 7 to be linear (i.e., spring force proportional to deflection) in the region 111 of small deflections; but if deflection exceeds a predetermined limit value, the spring force abruptly drops, as in the region 112.

Figure 6:
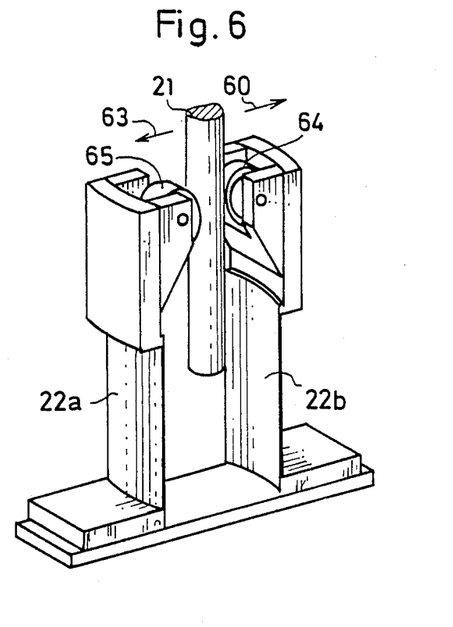
FIG. 6 is an enlarged isometric view of a spring system contained in the probe head of FIG. 2.
Figure 8:
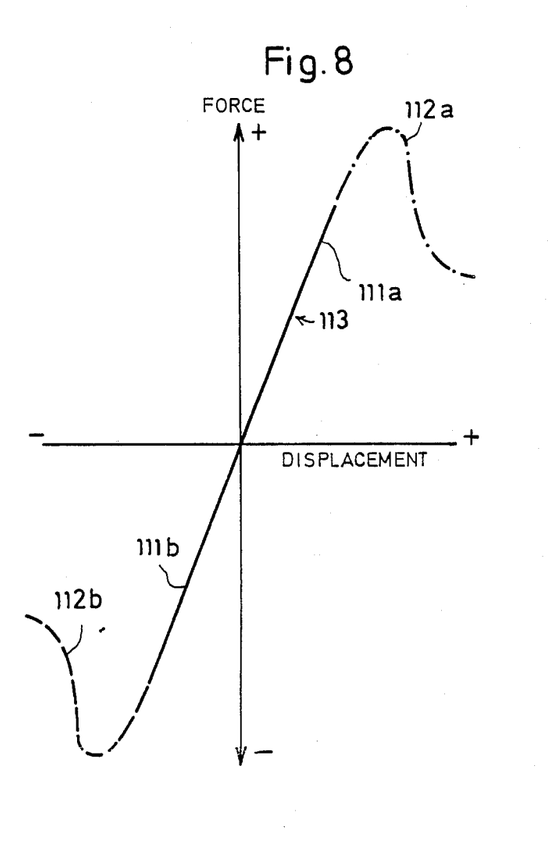
FIG. 8 is a graph depicting the net force vs. displacement characteristic for the two opposed springs of FIG. 2, each having the characteristic of FIG. 7.

In the presently preferred embodiment, the spring system 22 is as shown in detail in FIG. 6, wherein each of the elements 22a 22b is a leaf spring which is developed as part of a cylindrical shell or is otherwise curved about its longitudinal axis. The two leaf springs 22a, 22b have their concave sides facing each other and mount ball-bearing rollers 64, 65 at their respective outer free ends. In the absence of a workpiece contact, the cylindrical rod end of bar 21 is clamped, free of play and substantially without friction, between these two rollers 64, 65. Upon displacement of bar 21 in the direction indicated by arrow 60, leaf spring 22b produces an opposing force which is proportional to deflection and then snaps over in response to greater displacement (cricket effect), as suggested by the characteristic curve of FIG. 7. Leaf spring 22a behaves in corresponding manner, for deflection in the opposite direction, i.e., in the direction of arrow 63. In FIG. 8, the respective spring characteristics of the opposed leaf springs (22a, 22b) are graphically superposed on the same force-displacement scales. A heavy line 113 indicates the linear characteristic which results from opposing action of the two springs.

Returning now to FIG. 2, the second incremental displacement-measuring system will be described in connection with the first spring-suspension half of the Hooke's joint, namely, involving bar members 7, 8, connected by leaf springs 9 for limited rotational displacement of probe 14 (and its probe pin) about a first axis 17 orthogonal to the direction 6, and accounting for probe-pin displacement in the direction of double-headed arrow 15, it being noted that bar member 7 is securely mounted at 7' to the side panel 4 which is displaceable in the z-direction.

The movable member 8 of this first half of the spring joint is securely attached, via a yoke-shaped connecting part 38, to an arm 23 which carries a scanning grid 24, and the latter cooperates with a measurement grid 25 which is securely attached to the displaceable panel 4. The two grids 24, 25 establish the second incremental displacement-measuring system, which responds solely to movement of the probe 14 in the direction of arrow 15, with accompanying movement of the grid-support arm 23 in the same direction 15.

Figure 4:
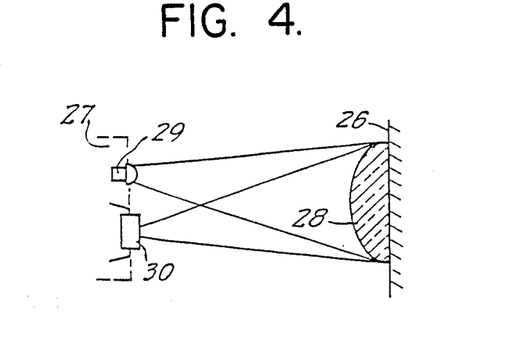
FIG. 4 is a simple optical diagram of an opto-electronic zero-indicator component of the probe head of FIG. 2.

The support arm 23 also securely mounts a part 26 which optically cooperates with a coacting part 27 that is securely mounted to the displaceable side panel 4. The parts 26 and 27 form a zero-position indicator which may be a component of one of the tare-adjusting systems of said copending application Ser. No. 225,178, and which also serves incremental-measurement purposes of the present invention; in this connection, it will be understood that, once having achieved any and all taring adjustments for a given orientation or reorientation of the probe head, the taring procedural cycle is shut down, so that the incremental-measurement process associated with workpiece contact can proceed without interfering with the taring process, and vice versa. In FIG. 4, it can be seen that part 26 carries a cylindrical lens 28, while part 27 carries a light-emitting diode 29 and a differential diode 30. Light from diode 29 is focused by the cylindrical lens 28, having a flat rear mirror surface, to a focal line at the differential diode 30. This differential diode is so developed that it senses in highly sensitive fashion the existence and the directional sense of any deviation of the focal line from the zero position established by the diode itself.

For reasons of clarity, zero indicators for the other coordinate directions have not been shown in FIG. 2. However, it must be emphasized that each individual incremental displacement measurement system is provided with a zero indicator.

The movable member 8 of the first half 7, 8 of the Hooke's joint also securely mounts a bar 31 which cooperates with opposing elements 32a, 32b of a second opposed-spring system; this cooperation occurs in the same way as the cooperation of bar 21 with the opposed elements of spring system 22 and thus assures a predetermined application of work-contact pressure by probe 14 in the direction 15.

The second half 10, 11 of the Hooke's joint permits movement of probe pin 14 in the direction indicated by arrow 16. The bar member 10 of this second Hooke's-joint half forms a rigid cross with, and is therefore securely attached to the movable member 8 of the first half 7, 8 of the joint. On the one hand, the probe 14 and, on the other hand, a support arm 33 are securely attached to the movable member 11 of the second half 10, 11 of the spring joint, and support arm 33 carries a measurement grid 34. This measurement grid cooperates with a scanning grid 35 which is carried by a support arm 36, and arm 36 is mechanically rigidly attached to the rigid cross-shaped part 8/10 of the first half 7, 8 of the joint. When probe 14 is displaced in the direction of arrow 16, movable grid 34 is displaced relative to grid 35 (which is stationary for this direction of movement), and third incremental displacement-measurement signals are produced.

For opposed-spring action in the second half 10, 11 of the Hooke's joint, a plate 61 mounts opposing elements 37a, 37b of a third spring system 37 which acts on the bar 31 which has already been described as being rigid with the cross-shaped support 8/10. Plate 61 is attached, via an angularly bent connecting part 39 (only partly visible), to the movable probe-support member 11.

Figure 5:
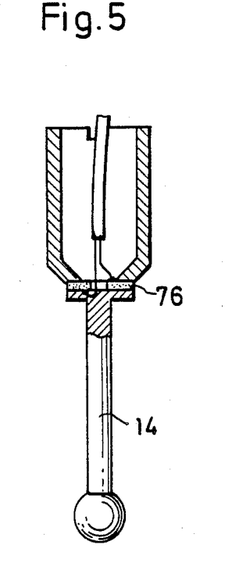
FIG. 5 is a view in elevation, partly broken-away and in longitudinal section, to show a work-contact sensor embodied in the probe of the probe head of FIG. 2.

Probe 14 will be understood to be replaceably carried by arm 11 of the second half 10, 11 of the Hooke's joint. As shown in FIG. 5, probe 14 can be developed as a rigid pin which carries a highly sensitive, e.g., piezoelectric, sensor 76 to initiate a trigger pulse upon initial probe-tip contact with the object being measured. In this connection, it is of very particular advantage to arrange this sensor as close as possible to the work-contacting tip of the probe, in order substantially to eliminate any travel-time effects.

Figure 3:
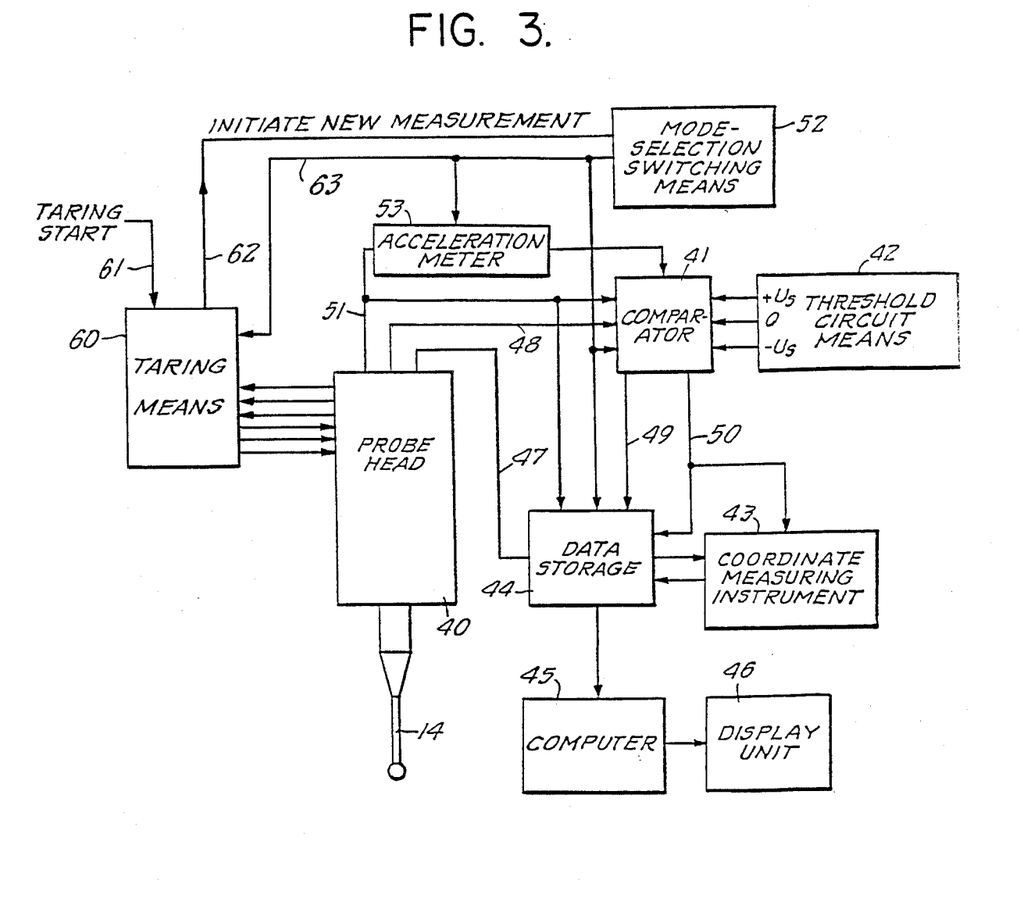
FIG. 3 is an electrical diagram schematically showing electronic components associate with probe deflection and coordinate measurement with the probe head of FIG. 2.

In the electrical diagram of FIG. 3, a comparator 41 is supplied with three threshold-value signals from circuit means 42, thus enabling comparator 41 to be switched from one to another of three threshold-value levels, which will be referred to as $-U_S$, 0 and $+U_S$.

A coordinate-measuring instrument 43 will be understood at all times to produce coordinate-value signals which correspond to instantaneous space coordinates of the tip of probe 14 of probe head 40. These coordinate-value signals are fed to a data-storage device 44, associated with a computer 45 and a display unit 46.

Switching-probe use of the probe head 40 will now be described. The probe head 40 structurally corresponds to what has been described in connection with FIG. 2, the sensor 76 of probe 14 supplying, at the instant of initial contact with the measurement object, a trigger pulse which is fed via line 47 to the storage device 44. This trigger pulse freezes the coordinate signal supplied by the coordinate-measuring instrument 43 at the instant of trigger-pulse occurrence. The inertia and momentum involved in driven displacement of the probe head 40 necessarily force the work-contacting process to continue, with displacement of probe 14 out of its zero position. But the zero indicators (e.g., 26, 27), which are separately provided in each of the three displacement-measurement systems of probe head 40, supply (via a cable connection 48) individual deflection-component signals to comparator 41. As soon as any of these deflection-component signals exceeds a preestablished threshold value $\pm U_S$, comparator 41 delivers an additional-pulse signal via line 49 to the storage unit 44, causing the latter to forward to computer 45 the coordinate values transiently retained from the instant of the trigger-pulse occurrence.

There must be a predetermined time difference, between the trigger-pulse instant and the additional-pulse signal of the comparator 41. Only if this difference is reached or exceeded is there deemed to be a correct contacting of the workpiece. This additional-pulse signal therefore serves to validate coordinate data associated with occurrence of the trigger pulse, it being noted that only limited demands are made on accuracy of the zero indicators in this switching-probe mode of operation.

It will be understood that comparator 41 also delivers its additional-pulse signal via line 50 to the motor-drive control of the coordinate-measuring instrument 43, causing the latter to arrest the probe head from further advancing movement in contact with the workpiece.

It is also possible to utilize the probe head 40 such that its operation as a switching probe occurs solely through combination of three highly precise zero indicators (e.g., 26, 27), with comparator 41, and with the three incremental displacement-measurement systems 24, 25; 19, 20; 34, 35. In this case, the probe 14 does not require a sensor. Upon contact with an object location to be measured, at least one of the three zero indicators (26, 27) moves out of its zero position, i.e., a zero-indicator signal is fed to comparator 41 via cable 48. As soon as such a signal exceeds a limit value ($+U_S$ or $-U_S$), the rising flank of the switch pulse produced by the comparator initiates a trigger pulse which is fed to the storage unit 44 to freeze the instantaneous coordinate values. The repeatable precision of measurement force, and thus overall precision, is in this case determined by the precision of the zero indicators (26, 27). And the signal for verification of the trigger pulse is in this second case advisedly derived from the displacement-measurement systems.

In another embodiment of the probe head 40, the probe 14 is again used without a sensor. The signals produced by the displacement-measurement systems are detected on-line so that the instantaneous position of the tip of the probe pin is known at all times. If the position of the probe tip suddenly changes, then contact is present. To derive the trigger pulse, an acceleration meter 53 is used to supply a trigger pulse when a predetermined limit of dv/dt is exceeded. The additional signal for verification of this trigger pulse is advisedly also derived from the displacement-measurement systems.

Measuring-probe use of the probe head 40 of the invention will now be described. In this case, a trigger pulse supplied via line 47 is fed to storage unit 44, but it does not perform any further function there. The signals of the zero indicators are fed via cable 48 to comparator 41 while, at the same time, the signals of the displacement-measurement systems 19, 20; 24, 25; 34, 35 are fed via cable 51 to storage unit 44. As soon as the comparator 41 notes from cable 48 that one of the signals of the zero indicators (26, 27) exceeds one of the present threshold values $\pm U_S$, it sends an output signal via line 49 to the storage 44.

In a first measuring mode of operation, arrival of a comparator-output signal via the line 49 at storage unit 44 is operative to send a signal to the coordinate-measuring instrument 43, causing the latter to brake the scanning process and to return the probe head back to the position of initial contact with the workpiece. As soon as this position has been reached and has been indicated by a corresponding output signal from comparator 41 over line 50, the then-applicable coordinate data (i.e., coordinate data for the zero position) are supplied from the coordinate-measuring instrument 43 and via storage unit 44 to the computer 45. At this time, therefore, zero signal is present in lines 48 and 51.

In an alternative measuring mode of operation, the setting to zero position is dispensed with. The measurement value is determined directly, beginning with initiation of the braking process.

In a third alternative mode of operation, the threshold-noting output pulse from the comparator 41 is operative to cause storage unit 44 to transfer to the computer 45 both (a) the coordinate data instantaneously available from the coordinate-measuring instrument and (b) the output-signal values of the respective displacement-measuring systems of the probe head 40, and the computer 45 calculates actual coordinate values from these two data sources. In this third alternative mode of operation, it is noted that the probe head 40 can scan an object to be measured along a predetermined line of displacement, with the output pulses from comparator 41 being triggered in a continuous succession in the course of programmed control of probe-head displacement.

In view of the fact that different modes are optionally available for operation of the invention, the circuitry of FIG. 3 is shown at 52 to include selectively operable means for coordinated switching control of the various functions of comparator 41, of storage unit 44, and also possibly of computer 45, as between the individual modes of operation of probe head 40. And since the switch elements of FIG. 3 are commercially available components, the construction of the described circuitry does not present any problem.

It has been generally indicated above that, whatever the selection of switching-type or measuring-type probe operation, involving a workpiece-contacting procedure, the probe head 40 may have just been reoriented for a predetermined optimum aspect from which to perform the workpiece-contacting procedure. That being the case, it is to be understood that the multiple-axis taring-adjustment procedure of copending application Ser. No. 225,178 is to be automatically performed prior to activation of any workpiece-contacting procedure. In order to illustrate this fact, FIG. 3 includes a single box 60 (labelled TARING MEANS) having three incoming lines from, and three outgoing control lines to, probe head 40; this single box is to be understood as comprising automatic taring-system components of FIG. 4 of said copending application. Thus, upon completion of a probe-head reorientation, a taring-start signal at 61 will be understood to initiate the adjustments to compensate for the new gravity-force vector involved in the reorientation, and upon completion of taring adjustments, the taring means provides an output signal for continuing the program of measurement, as here indicated by the legend "Initiate New Measurement" for a control-line connection 62 to the switching means 52; the selected one of the various work-contacting probe operations then proceeds automatically for a new measurement, as already described.

In addition to the foregoing observation as to taring prior to initiating a workpiece-measurement cycle, it should be noted that the zero indicators (26/27), described herein as probe-deflection sensitive devices for accurately indicating component values of probe-pin deflection upon workpiece contact, are or can be of precisely the same nature as the zero-position indicators (40/41) used in the automatic-taring adjustments of said copending application Ser. No. 225,078. That being the case, the probe head 40 need be equipped with but one such zero indicator for response to deflection on each of the three orthogonal axes, and a control-line connection 63 in FIG. 3, from switching means 52 to taring means 60 is to be understood as a schematic indication of a switching change in the utilization of the same three zero indicators, from exclusively taring-adjustment control as long as taring operations are proceeding (and, therefore, before the measurement phase has been switched-on), to probe-deflection-measurement procedure as long as the measurement phase has been switched-on (and while the taring-adjustment phase has been switched-off).

It is observed that, in the described opposed-spring technique discussed in connection with FIGS. 6 to 8, relatively undamped probe vibration is inherent with respect to the zero position for each of the coordinate directions of measurement, i.e., prior to probe-pin contact with a workpiece. Such vibration can arise from the transient of advancing the probe head (and thus the probe pin) in the direction for a work-contacting measurement. But the probe head contains, for each of the orthogonally related components of probe deflectability, a sensor device (e.g., 19/20, 24/25, 34/35) which continuously tracks instantaneous position of each of the coordinates of probe position (with respect to the involved zero position), and in the course of any vibration prior to workpiece contact; and this continuous tracking, for each component direction, produces an electrical signal which is at all times proportional to the instantaneous position of probe offset from the involved zero position. Thus, at the instant of workpiece contact, signalled by a piezo-pulse development at 76 machine-coordinate data can be frozen at the instant of workpiece contact, and the sensor-device outputs (from 19/20, 24/25 and 34/35) can also be temporarily sampled and held, so that these sampled-and-held sensor outputs can be applied (by evaluation means in the computer) as corrections to the frozen machine-coordinate data, thereby obtaining only true (corrected) coordinate data for entry into computer storage.

What is claimed is:

1. A probe head for a coordinate-measuring instrument having a probe-suspension system which defines a three dimensional coordinate system wherein a probe can be deflected in all three directions in space, characterized by combination of the following features:
   (a) a displacement-measuring system (34, 34; 24, 25; 19, 20) is provided in the probe head (40) for each of the three coordinate directions (x, y, z), each of said systems producing signals which are proportional to the deflection in the corresponding coordinate direction;
   (b) each displacement-measuring system includes means for recognizing the zero position of the involved system;
   (c) deflectable means (22, 32, 37) are provided to retain the probe (14) in the zero position of the displacement-measuring system, in the absence of a deflection force on the probe; and
   (d) selectively operable means (52) are provided for switching the probe head (40) between the switching mode of operation in which a trigger signal is produced and is used for a coordinate measurement, and a measuring mode of operation in which signals generated by one or more of the displacement measuring systems are used for the coordinate measurement.

2. A probe head according to claim 1, characterized by the fact that the trigger pulse is derived from one or more of said means for recognizing the zero position.

3. A probe head according to claim 2, characterized by the fact that a comparator (41) for producing the trigger pulse is coupled to said means for recognizing the zero position.

4. A probe head according to claim 1, characterized by the fact that an additional sensor (76) is provided to initiate the trigger pulse and is connected directly to the probe (14).

5. A probe head according to claim 4, characterized by the fact that the sensor (76) is arranged in the vicinity of the tip of the probe.

6. A probe head according to claim 1, characterized by the fact that for the initiating of the trigger pulse, an acceleration meter (53) is supplied with output signals of the displacement-measuring systems (19, 20; 24, 25; 34, 34), and means are provided to initiate the trigger pulse when a preselected acceleration value (dv/dt) is exceeded.

7. A probe head according to claim 1, characterized by the fact that each of the displacement-measurement systems (34, 34; 24, 25; 19, 20) delivers an incremental signal, and that said means for recognizing the zero position is connected to each displacement measuring system.

8. A probe head according to claim 1, characterized by the fact that said means for recognizing the zero position is optoelectronic.

9. A probe head according to claim 1, characterized by the fact that, for each of the suspension systems, said deflectable means for retaining the probe (14) comprises a pair of springs (22, 32, 37) preloaded against each other for urging said probe toward the zero position in the involved coordinate direction and for assuring a predetermined application pressure of probe contact with a workpiece.

10. A probe head according to claim 9, characterized by the fact that each of said springs (22, 32, 37) has a force-displacement characteristic which drops off beyond a predetermined limiting value of displacement.

11. A probe head according to claim 9, characterized by the fact that for each of the suspension systems said pair of springs (22, 32, 37) comprises two cantilevered leaf springs each of which is developed as a cylindrical shell curved perpendicular to its longitudinal length and that a bar (21, 31) which is rigid with the deflectable part (3, 8) of the involved suspension system is engaged by and between the leaf springs.

12. A probe head according to claim 11, characterized by the fact that each of the leaf springs (22, 32, 37) carries a roller (64, 65) on its free end.

13. A probe head according to claim 11, characterized by the fact that, for each of the suspension systems, both leaf springs (22a, 22b) are curved concave towards the bar (31, 21).

14. A probe head for a coordinate-measuring machine, said head including a body, a work-contacting probe and means for multiple-axis yieldable suspension of said probe with respect to said body, said suspension having low friction for probe displacement at and near a zero position of the probe in its suspension, whereby relatively undamped probe vibration is inherent with respect to said zero position, said probe head containing sensor means tracking instantaneous probe position with respect to said zero position in the course of said vibration and producing an electrical signal proportional to the instantaneous position of probe offset from said zero position, detector means for developing an electrical signal in response to probe contact with a workpiece, and evaluation means including trigger means connected to the output of said sensor means and responsive to initiation of said detector signal for sampling and holding the electrical-signal value of said sensor means at the instant of workpiece contact, whereby the sampled and held value is available for use as an incremental correction for coordinate measurement of probe-head position on a coordinate-measuring machine to which the probe head is mounted.

15. A coordinate-measuring machine including probe head movably mounted to said machine, and means for measuring the instantaneous position of the probe head on the machine; said head including a body, a work-contacting probe and means for multiple-axis Yieldable suspension of said probe with respect to said body, said suspension having low friction for probe suspension at and near a zero position of the probe in its suspension, whereby relatively undamped probe vibration is inherent with respect to said zero position, said probe head containing sensor means tracking instantaneous probe position with respect to said zero position in the course of said vibration and producing an electrical signal proportional to the instantaneous position of probe offset from said zero position, detector means for developing an electrical signal in response to probe contact with a workpiece, and evaluation means including trigger means connected to the output of said sensor means and responsive to initiation of said detector signal for sampling and holding the electrical-signal value of said sensor means at the instant of workpiece contact, and means supplying the sampled and held value to the measuring means of said machine, whereby the sampled and held value can be utilized as an incremental correction for coordinate measurement probe-head position on the machine.

16. The probe head of claim 14 or the machine of claim 16, in which said detector means comprises piezoelectric means carried by said probe.

17. The probe head of claim 13 or the machine of claim 15, in which said detector means comprises electronic means tracking the cyclical course of velocity of changing probe position in the course of said vibration and developing an electric output trigger signal at outset of a transient change said velocity course.

18. A probe head according to claim 1, in which taring means is operative to adjust the displacement-measuring system for each of the three coordinate-measuring directions, and in which means coordinate with said selectively operable means is operative to temporarily disable the probe head from a work-contacting measurement procedure unless and until completion of any taring operation which may be necessitated by the instantaneous orientation of said probe head.

19. A probe head according to claim 1, characterized by the fact that the probe-suspension system comprises, for one of said coordinate directions, a displaceable part (4) which can be moved in longitudinal translation and, for the other two of said coordinate directions, a Hooke's joint (7-12) which is adapted to mount the probe (14), the Hooke's joint having two pivot axes (17,18) which are orthogonal to each other and to the direction of longitudinal translation of said one displaceable part.

* * * * *